3,179,652
ANTIBIOTIC RECOVERY PROCESS AND SALTS PRODUCED THEREBY
Walter D. Celmer, New London, Conn., assignor to Chas. Pfizer & Co., Inc., New York, N.Y., a corporation of Delaware
No Drawing. Filed Sept. 5, 1961, Ser. No. 135,753
9 Claims. (Cl. 260—210)

This invention relates to a novel recovery process which is especially applicable to certain macrolide-type antibiotic bases. More particularly, it is concerned with the recovery and/or purification of such antibiotics as carbomycin, erythromycin and oleandomycin as well as with their acylated derivatives like monopropionylerythromycin and triacetyloleandomycin. All these compounds will hereinafter be referred to as macrolide-type antibiotic base compounds. There is also included within the purview of this invention various novel salt intermediates produced by this recovery process.

In accordance with the prior art, difficulty has often been encountered in obtaining macrolide-type antibiotic compounds in relatively pure condition from the crude reaction mixtures in which they are first formed, i.e., no satisfactory recovery process for this purpose has heretofore ever been devised. Furthermore, such type compounds do not readily lend themselves to further purification very easily in view of the solubility problem which they present. This latter factor is also particularly acute in connection with the question of finding suitable water-soluble forms for these antibiotic compounds so as to facilitate their in vitro testing for assay purposes. It is, therefore, a primary object of the present invention to provide a suitable recovery method for the purification of macrolide-type antibiotic compounds. Another object of the invention is to provide new water-soluble forms of these antibiotics whereby the aforementioned type testing can be effectively carried out. Other objects and advantages of the present invention will be apparent to those skilled in the art from the description which follows.

In accordance with the present invention, it has now been unexpectedly found that macrolide antibiotic base compounds of the aforementioned type form nicely crystalline salts with a variety of sulfonic acids and that such salts readily lend themselves to use as intermediates in regenerating the parent antibiotic. Specifically, the sulfonic acids with which the process of the present invention is concerned are hydrocarbon monosulfonic acids, such as lower alkane hydrocarbon sulfonic acids like methanesulfonic acid or aromatic hydrocarbon sulfonic acids like benzenesulfonic acid and p-toluenesulfonic acid. The advantages afforded by the use of the process of this invention are manifold: for instance, a sample of crude macrolide antibiotic base such as triacetyloleandomycin can be upgraded to goods of finished quality in approximately an 80% overall yield; while little time or expense is involved in the operation of such process since the reagents needed are relatively cheap and/or easily obtainable and no expensive equipment is required. Furthermore, the novel intermediate salts obtained thereby and especially the lower alkane sulfonates have an additional utility in providing new elegant water-soluble forms of these antibiotics, thus fulfilling a long-wanted need in this respect. This is particularly true, as has been previously indicated, in connection with the problem of finding a suitable way for assaying on an in vitro basis the various microorganisms which are sensitive to these particular antibiotic compounds [e.g., see J. W. Czekalowski in Nature, vol. 189, p. 752 (1961)]. Typical examples of these salts include such compounds as triacetyloleandomycin methanesulfonate, monopropionylerythromycin ethanesulfonate, oleandomycin benzenesulfonate, erythromycin p-toluenesulfonate, and the like.

In accordance with the selective salt formation process of this invention for the recovery and/or purification of macrolide-type antibiotic compounds, an impure batch of the desired antibiotic is dissolved in a reaction-inert polar organic solvent such as a lower alkanol like methanol, ethanol, isopropanol, etc. (and preferably the latter named solvent), and mixed with a substantially equimolar amount (say, e.g., from about 0.9 to about 1.1 mole per mole of the antibiotic base) of the chosen hydrocarbon sulfonic acid (which may preferably be dissolved in a minimum amount of the same solvent). Other solvents which are applicable for these purposes include ethylene glycol; lower alkyl ketones, such as acetone, methyl ethyl ketone and methyl isobutyl ketone; N,N-di(lower alkyl) derivatives of lower alkane hydrocarbon carboxamides, such as N,N-dimethylformamide, N,N-diethylformamide, and N,N-dimethylacetamide; lower alkyl nitriles, such as acetonitrile, propionitrile, etc., and lower alkyl esters of lower alkanoic acids, such as isopropyl formate, ethyl acetate and methyl propionate. The amount of sulfonic acid employed in this connection should not vary considerably from the aforestated amount as less than a substantially equimolar portion understandably affords a lower yield of recovered salt, while the use of an excess amount is to be especially avoided in view of the inherent danger of degrading the antibiotic molecule. In general, the reaction can be effected at any temperature in the range of from about 0° C. up to about 80° C., but in practice, it is usually more convenient to mix the two reactants at about 50–65° C. and then to allow the resulting mixture to cool to room temperature (20–25° C.) while under constant agitation. Recovery of the desired sulfonic acid addition salt from the reaction mixture is then easily achieved by conventional means, if necessary, i.e., the salt may crystallize out of solution of its own accord or it may be necessary to evaporate some of the solvent first until crystallization commences or to chill said solution quite rapidly to a point slightly below room temperature until said step is completely effected.

Reconversion of the salt prepared in the above manner to the corresponding free antibiotic base is readily accomplished, as previously indicated, by first filtering the crystalline slurry and dissolving the filter cake thus obtained in an aqueous lower alkanol solution containing at least about 10% by volume of water, and then adjusting the pH of the resulting medium to a value that is at least about 8.0 and preferably from about 8.0 to about 9.0 by means of aqueous alkali. The pure base is then precipitated from solution by the addition of a sufficient amount of water to accomplish same and this usually requires from about two to four times the volume of the original solution. The final isolation step, of course, involves recovery of the product by means of suction filtration and the subsequent drying of the filter cake to a constant weight value. In this manner, a relatively crude sample of triacetyloleandomycin (ca. 87.5% pure) can be upgraded to a product of finished goods quality (95% or better purity) in an approximately 80% overall yield via the crystalline sulfonic acid addition salt intermediate.

Although this process is especially preferred in the recovery of such compounds as monopropionylerythromycin and triacetyloleandomycin, it is equally applicable to other macrolide-type antibiotic compounds as well, as previously mentioned, e.g., carbomycin, monocetylcarbomycin, erythromycin, monoacetylerythromycin, oleandomycin, tripropionyloleandomycin, etc. These particular compounds are all well-known antibiotics which are commercially available or else they are easily derived esters thereof which can be readily prepared as previously described in the literature [e.g., see F. A. Hochstein et al. in the Journal of the American Chemical Society, vol. 76, p. 5080 (1954) for monoacetylcarbomcycin, V. S. Stephens et al. in Antibiotics Annual 1958–1959, p. 346 for monoacetylerythromycin, and W. B. Celmer in copending U.S. patent application Serial No. 719,705, filed March 7, 1958, now U.S. Patent No. 3,022,219, for tripropionyloleandomycin].

This invention is further illustrated by the following examples, which are not to be construed in any way as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

Example I

Forty-one grams of relatively crude (i.e., 87.5±3.5% pure) triacetyloleandomycin crystals (yellow colored, bitter-tasting) were dissolved in 175 ml. of warm (55–60° C.) isopropanol in a 600 ml. Pyrex beaker provided with magnetic stirring. A solution consisting of 4.81 g. of methanesulfonic acid dissolved in 25 ml. of isopropanol was then added to the stirred triacetyloleandomycin solution during the course of a five-minute period. The resultant reaction solution was then stirred in the absence of any external heat (or freezing, for that matter) to allow spontaneous cooling and subsequent crystallization to take place until room temperature (20–25° C.) was attained (this required approximately one and a half hours). The crystals thus obtained were subsequently recovered by means of filtration and sucked free of the mother liquor on a Büchner funnel. The wet filter cake was then reslurried in a fresh portion of isopropanol (40 ml.) and this time sucked dry on the filter funnel. In this way, there was obtained 38 g. of pure air-dried triacetyloleandomycin methanesulfonate in the form of prismatic needles melting at 136–140° C. (decomp.).

Example II

The procedure described in Example I is followed except that carbomycin rather than triacetyloleandomycin is employed as starting material on the same molar basis. In this case, the corresponding product obtained is carbomycin methanesulfonate.

Example III

The procedure described in Example I is followed except that oleandomycin rather than its triacetyl ester is employed as starting material on the same molar basis. In this case, the corresponding product obtained is oleandomycin methanesulfonate.

Example IV

The procedure described in Example I is followed except that erythromycin rather than triacetyloleandomycin is the starting material employed on the same molar basis. In this case, the corresponding product obtained is erythromycin methanesulfonate.

Example V

The procedure described in Example I is followed except that monoacetyloleandomycin rather than the triacetyl ester is the starting material employed on the same molar basis. In this case, the corresponding product obtained is monoacetyloleandomycin methanesulfonate.

Example VI

The procedure described in Example I is followed except that monoacetylerthyromycin rather than triacetyloleandomycin is the starting material employed on the same molar basis. In this case, the corresponding product obtained is monoacetylerythromycin methanesulfonate.

Example VII

The procedure described in Example I is followed except that monopropionylerythromycin rather than triacetyloleandomycin is the starting material employed on the same molar basis. In this case, the corresponding product obtained is monopropionylerythromycin methanesulfonate.

Example VIII

The procedure described in Example I is followed except that tripropionyloleandomycin rather than the triacetyl ester is the starting material employed on the same molar basis. In this case, the corresponding product obtained is tripropionyloleandomycin methanesulfonate.

Example IX

The procedure described in all the previous examples is repeated using equivalent amounts (in moles) of other sulfonic acids in place of methanesulfonic acid in each case. For the sake of time and convenience and in order to avoid any unnecessary repetition of experimental detail, these acids are listed as follows: ethanesulfonic acid, n-butanesulfonic acid, benzenesulfonic acid and p-toluene-sulfonic acid. In each and every case, the corresponding macrolide antibiotic sulfonic acid addition salt is the product obtained.

Thus, when monopropionylerythromycin and ethanesulfonic acid react on the same molar basis as the reactants in Example I, the corresponding product obtained is monopropionylerythromycin ethanesulfonate. In like manner, oleandomycin and benzenesulfonic acid react to afford oleandomycin benzenesulfonate, while erythromycin and p-toluenesulfonic acid react to afford erythromycin p-toluenesulfonate.

Example X

The salt prepared in Example I was dissolved in an aqeuous alcohol solution consisting of 48 ml. of water and 192 ml. of isopropanol. The pH of the resulting solution was then adjusted to 8.5 with 1 N aqueous sodium hydroxide (slightly less than 38 ml. of the latter reagent were required) and 240 ml. of additional water were slowly added thereto during the course of a fifteen minute period with constant agitation being maintained throughout this step. Crystallization soon occurred and after a few minutes, additional water (480 ml.) was added to the mixture over a period of five minutes. After stirring the mixture for an additional 45 minutes at room temperature, the crystals were recovered by means of filtration and the wet cake washed with 192 ml. of a 4:1 (by volume) water-isopropanol mixture. The washed cake was then sucked dry to the touch on the filter funnel and subsequently dried to constant weight at 60° C. in a drying oven. In this manner, there was obtained a 30 g. yield of pure triacetyloleandomycin in the form of bland-tasting, colorless crystals having the following characteristic properties: bioassay value, 801 (±4%) units/mg. vs. oleandomycin standard using B. subtilis as the test organism (plate assay method); solubility analysis, 96.5±1.5% [as determined in isopropanol solution, applying the principles described by Herriott in Chemical Reviews, vol. 30, p. 413 (1942)]. This represented an overall yield of 75% for the upgraded product (now of finished goods quality), based on the amount of crude starting material that was subjected to this two-step process.

Example XI

The procedure of Example X is repeated using the other macrolide antibiotic salts prepared in Examples II–IX. In each and every case, the corresponding antibiotic bases were respectively obtained in good yield and in pure form, being of substantially the same order of magnitude in this respect as the product reported in the previous example.

What is claimed is:

1. A monosulfonic acid addition salt of a macrolide base selected from the group consisting of carbomycin, monoacetylcarbomycin, erythromycin, monoacetylerythromycin, monopropionylerythromycin, oleandomycin, monoacetyloleandomycin, triacetyloleandomycin and tripropionyloleandomycin, the sulfonic acid moiety being a lower alkane hydrocarbon sulfonic acid.

2. A mono-benzenesulfonic acid addition salt of a macrolide base selected from the group consisting of carbomycin, monoacetylcarbomycin, erythromycin, monoacetylerythromycin, monopropionylerythromycin, oleandomycin, monoacetyloleandomycin, triacetyloleandomycin and tripropionyloleandomycin.

3. Triacetyloleandomycin methanesulfonate.
4. Monopropionylerythromycin ethanesulfonate.
5. Oleandomycin benzenesulfonate.
6. Carbomycin methanesulfonate.
7. Erythromycin methanesulfonate.
8. Monoacetyloleandomycin methanesulfonate.
9. Monoacetylerythromycin methanesulfonate.

References Cited by the Examiner
UNITED STATES PATENTS

| | | | |
|---|---|---|---|
| 2,771,392 | 11/56 | Tanner et al. | 260—210 |
| 2,916,483 | 12/59 | Dutcher et al. | 260—210 |
| 2,993,833 | 7/59 | Stephens | 260—210 |
| 3,000,874 | 9/61 | Bray et al. | 260—210 |
| 3,042,581 | 7/62 | Penau et al. | 260—210 |

OTHER REFERENCES

Clark, Jr., et al.: Antibiotics and Chemotherapy, vol. V, No. 4, pages 206–217 (1955).

Peterson et al.: J.A.C.S., vol. 72, pages 3598–3603 (1950).

LEWIS GOTTS, *Primary Examiner.*

A. LOUIS MONACELL, *Examiner.*